United States Patent Office 3,692,480
Patented Sept. 19, 1972

3,692,480
METHOD FOR CONTROLLING A SULFUR RECOVERY PROCESS
Jacobus Snoek and Jaap E. Naber, Amsterdam, Netherlands, assignors to Shell Oil Company, New York, N.Y.
Filed May 19, 1971, Ser. No. 144,834
Claims priority, application Netherlands, May 27, 1970, 7007611
Int. Cl. C01b 17/04
U.S. Cl. 423—239     7 Claims

ABSTRACT OF THE DISCLOSURE

A sulfur recovery process based on the reaction of hydrogen sulfide with sulfur dioxide wherein at least part of the sulfur dioxide is derived from the regeneration with a reducing gas of a loaded solid acceptor used in flue gas desulfurization is controlled by measuring the difference between the volume of reducing gas used in regeneration and the volume of off-gas obtained from regeneration, and employing this difference to control, either directly or indirectly, the composition of the gas mixture to the sulfur recovery process.

BACKGROUND OF THE INVENTION

Figure 1:
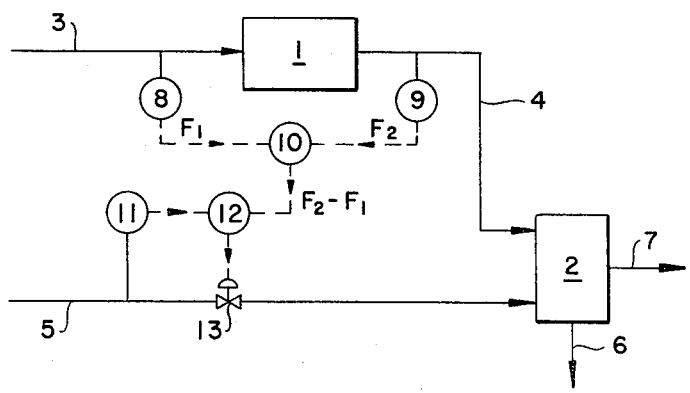

Sulfur oxides can be removed from oxygen-containing flue gases by means of a solid acceptor, such as one consisting of a metal and/or a metal compound on a carrier material. Very suitable solid acceptors include, for example, cupric oxide on a stable carrier such as alumina, silica and the like. It is of great importance, both technically and economically, that the binding of sulfur oxides by the acceptor takes place at flue gas temperatures, that is, at approximately 200°–500° C. After having passed over the acceptor, the flue gases can be discharged via a stack without causing air pollution.

The loaded acceptor can subsequently be regenerated with the aid of a reducing gas thus rendering it capable of binding new quantities of sulfur dioxide. The off-gas obtained from regeneration is far richer in sulfur dioxide than the non-purified flue gas. When hydrogen is used as the reducing gas, the regeneration off-gas may contain up to almost one third part of sulfur dioxide and up to two third parts of water vapor. Sulfur can be suitably recovered from the regeneration off-gas by reaction with hydrogen sulfide, thereby ensuring that sulfur compounds do not enter into the atmosphere and, in addition, recovering a valuable product. A process frequently employed for this purpose is that developed by Claus in which hydrogen sulfide is reacted with sulfur dioxide in the presence of a catalyst according to the reaction $$2H_2S + SO_2 \rightarrow 3S + 2H_2O$$

It is of great importance in such a process that the ratio of sulfur dioxide to hydrogen sulfide be closely controlled, otherwise the gas leaving the sulfur recovery reactor may contain impermissibly high concentrations of hydrogen sulfide or sulfur dioxide. This presents particular difficulties when such a recovery process is used to treat a sulfur dioxide-containing gas obtained from the regeneration of loaded solid acceptors because of the variable sulfur dioxide content of such streams. A number of methods have been proposed to control the ratio of sulfur dioxide to hydrogen sulfide under these variable conditions. However, none of these methods have proved to be entirely satisfactory.

SUMMARY OF THE INVENTION

It has now been found that a process for the recovery of sulfur from a sulfur-dioxide-containing gas by reaction of the sulfur dioxide with hydrogen sulfide, at least part of which sulfur-dioxide-containing gas is derived from regeneration with a reducing gas of a loaded solid acceptor that has been used for the removal of sulfur oxides from gases, such as flue gases, can be controlled by: (a) measuring the magnitude of the reducing gas stream employed in regeneration thereby obtaining a signal $F_1$ corresponding to that magnitude, (b) measuring the magnitude of the sulfur dioxide-containing gas stream derived from the regeneration thereby obtaining a signal $F_2$ corresponding to that magnitude, (c) determining the difference between $F_2$ and $F_1$ and using this difference to set, either directly or indirectly, the desired composition of the gas mixture to the sulfur recovery process.

It is preferred that the molar ratio between hydrogen sulfide and sulfur dioxide in the gas mixture for sulfur recovery be approximately equal to two, the stoichiometric ratio in the above-mentioned reaction. In some cases, however, a molar ratio is chosen so as to be larger than two, so that there is an excess of hydrogen sulfide. This is of importance when the gases leaving the sulfur recovery reactor are incinerated in order that a flame temperature can be reached that is sufficiently high for hydrogen sulfide to be burned completely. However, in this case there will be some sulfur dioxide produced which will not happen when the aforementioned molar ratio is two.

DETAILED DESCRIPTION OF THE INVENTION

In the method according to the invention, variations in the quantity of sulfur dioxide supplied are measured, and the measured values used for control of the process for sulfur recovery. The reducing gas that is used for the regeneration of the loaded acceptor may be a hydrogen-containing gas. Use can also be made of a mixture of hydrogen, carbon monoxide and nitrogen. In the regeneration of cupric oxide solid acceptors the following reactions occur:

(1)     $CuO + H_2(CO) \rightarrow Cu + H_2O(CO_2)$ (2)     $CuSO_4 + 2H_2(2CO \rightarrow Cu + 2H_2O(2CO_2) + SO_2$ In reation (1), any cupric oxide still present is converted into copper. Here, if the temperature and the pressure remain the same, there will be no difference in volume between the gas supplied to the regenerator and the gas leaving the regenerator. In reaction (2), copper is obtained as well and the bound sulfur oxides which are released as sulfur dioxide. In this case a difference in the volume between the two said gas streams does occur. Hence, the net increase in volume during the regeneration of the loaded acceptor by means of a reducing gas is caused exclusively by the quantity of released sulfur dioxide, and the aforementioned difference $F_2 - F_1$ thus is a measure of the quantity of sulfur dioxide leaving the regenerator, per unit time. The signals $F_1$ and $F_2$ can be obtained by orifice plates in the gas lines concerned. These measurements are very reliable. Thus by the method according to the invention, a signal corresponding to the quantity of sulfur dioxide produced is obtained without a direct and continuous measurement of the sulfur dioxide concentration. This is a significant advantage over methods in which the actual sulfur dioxide concentration must be determined, e.g., by analysis of samples. Such measurements would be far from easy and would require costly equipment. Moreover, even if the concentration of sulfur dioxide were known, it would still be necessary to measure the magnitude of the gas stream.

The signal $F_2 - F_1$ is not only of importance for the control of the process, it is also an indication of the extent to which the regeneration process has progressed.

This indication permits optimization of the regeneration so as to prevent the regeneration continuing beyond the required time thereby avoiding unnecessary consumption of reducing gas. It is preferred that the signal $F_2-F_1$ be used for adjusting the supply of hydrogen sulfide to the sulfur recovery process in such a way that that supply is increased if that difference increases, and reduced if that difference decreases. This method is diagrammatically represented in FIG. 1.

In this figure, item 1 represents the regenerator and 2 the sulfur recovery reactor. It is possible for more than one reactor of this type to be arranged in series. Gas stream 3 consists of a reducing gas, while gas stream 4 contains sulfur dioxide, and gas stream 5 consists of hydrogen sulfide or a hydrogen sulfide-containing gas. From reactor 2 issues a stream of sulfur 6, and a gas stream 7 which contains, inter alia, water, carbon dioxide and/or nitrogen.

Meter 8 is a flowmeter used to measure reducing gas stream 3 which supplies the signal $F_1$. Meter 9 is a flowmeter used to measure the sulfur-dioxide-containing gas from the regenerator. This meter supplies the signal $F_2$. Element 10 is a subtracting element from which results the signal $F_2-F_1$. Meter 11 is a flowmeter used to measure the hydrogen sulfide-containing gas stream. This meter passes its signal to controller 12 whose output signal operates valve 13 in gas stream 5. If the set value of controller 12 is not changed, gas stream 5 will remain constant. However, here the set value of controller 12 is determined by the output signal from the element 10, hence by the difference $F_2-F_1$. If this difference increases, that is to say if the quantity of sulfur dioxide increases, then valve 13 is opened further and vice versa, so that the gas mixture in reactor 2 always has the desired composition for sulfur recovery. Minor variations in this method of control are possible, but these are entirely within the purview of the invention.

In the method discussed hereinabove, it is supposed that the stream of sulfur dioxide can be adjusted independently of its source of production. This possibility does not always exist, however, and the invention furthermore provides a method for the control of a process in which the said sulfur dioxide-containing gas is used in a process for sulfur recovery that is likewise employed for the recovery of sulfur from hydrogen sulfide or from a hydrogen sulfide-containing gas stream with application of partial oxidation of hydrogen sulfide to sulfur dioxide by oxygen or an oxygen-containing gas. The sulfur-dioxide-containing gas stream derived from the regeneration in this case is combined with the sulfur dioxide-containing gas stream derived from the partial oxidation, and the aforementioned difference $F_2-F_1$ is used for the adjustment of the supply of oxygen or of oxygen-containing gas in such a way that that supply is decreased if that difference increases and increased if that difference decreases. Generally the oxygen-containing gas is air. The hydrogen sulfide may be derived, for instance, from a catalytic process for the desulphurization of petroleum products with the aid of hydrogen. The magnitude of the stream of hydrogen sulfide is then determined by that process and it is common practice to convert that hydrogen sulfide into sulfur by oxidizing approximately a third part of the quantity of hydrogen sulfide supplied to sulfur dioxide in an oxidation reactor, and to pass the mixture of hydrogen sulfide and sulfur dioxide in a molar ratio of two to one to a sulfur recovery reactor. The sulfur dioxide derived from the regeneration of the loaded acceptor may replace a corresponding part of the sulfur dioxide obtained in the partial oxidation of hydrogen sulfide. This is accomplished according to the invention by passing that sulfur dioxide likewise to the sulfur recovery reactor and to reduce the supply of oxygen-containing gas when the quantity of sulfur dioxide from the regenerator increases, i.e., when the difference $F_2-F_1$ increases, and vice versa. This method is diagrammatically represented in FIG. 2. The indications in this figure and in the following figures that have been used before have the same meaning as before.

Figure 2:
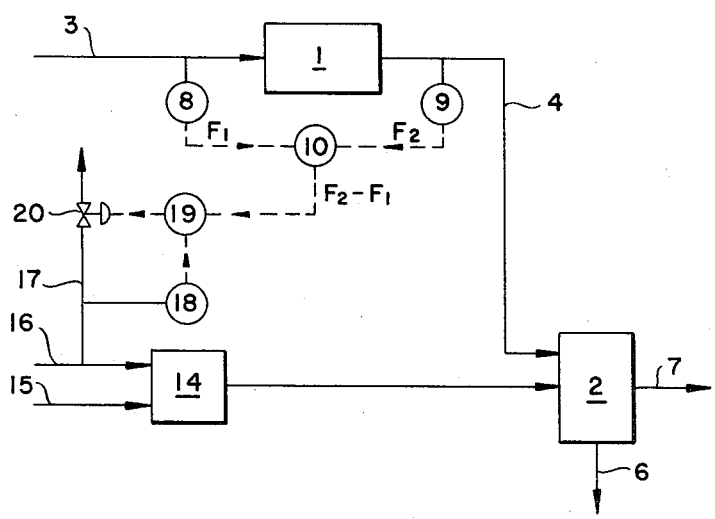

In FIG. 2, stream 15 comprising hydrogen sulfide or a hydrogen sulfide-containing gas, as well as stream 16 comprising oxygen or an oxygen-containing gas, for instance air, are passed to a partial oxidation unit 14. The magnitude of gas stream 16 is chosen so that this stream is in harmony with gas stream 15, which is mostly constant for a long period. It is possible to use ratio control for this purpose. The difference $F_2-F_1$ is now used for the adjustment of the supply of oxygen-containing gas to the oxidation unit 14. That adjustment can be made by adjusting the magnitude of a side stream taken from the stream of oxygen or of oxygen-containing gas, namely by increasing that side stream if that difference increases, and reducing it if that difference decreases. This case is represented in FIG. 2. The side stream is represented by 17. A flowmeter 18 measures the magnitude of the side stream. A signal from meter 18 passes to controller 19 which adjusts valve 20 in the side stream. The set value for controller 19 is suppled by the output signal from element 10, that is the difference $F_2-F_1$. The control of the process by means of increasing or decreasing the magnitude of a side stream is successful and requires a comparatively small control valve.

Figure 3:
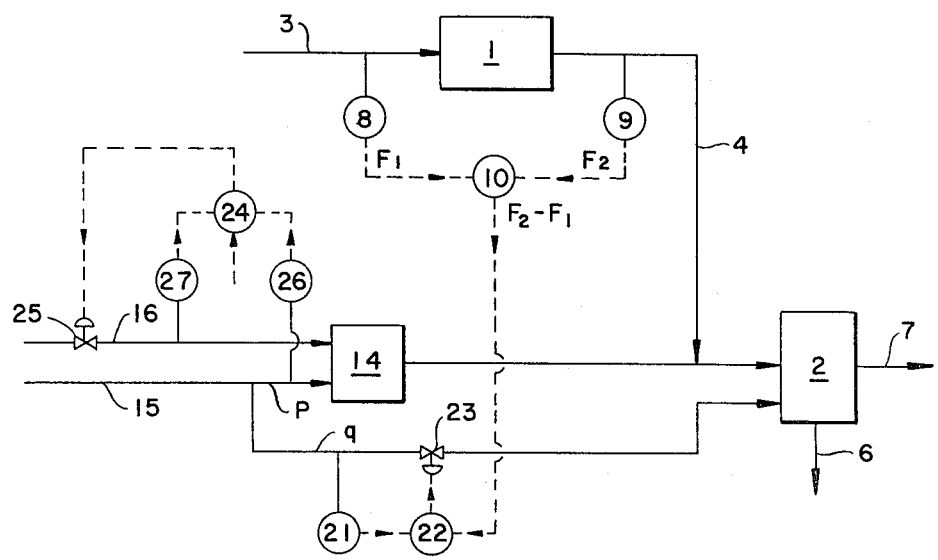

In some cases it is attractive for the stream of hydrogen sulfide-containing gas to be split into two partial streams $p$ and $q$, of which the partial stream $q$ is passed directly to the sulfur recovery reactor and the partial stream $p$ to the partial oxidation reactor, the aforementioned difference $F_2-F_1$ being used for the adjustment of the supply of oxygen or of oxygen-containing gas to the partial oxidation. This method, which is diagrammatically represented in FIG. 3, is of importance if the stream of hydrogen sulfide-containing gas is large. Then the partial stream $q$, which may amount to two thirds of stream 15, can be made to bypass unit 14, which will result in an important saving of cost. It is preferred that the magnitude of partial stream $p$ be chosen so that the variations expected to occur in the quantity supplied of sulfur dioxide originating from the aforementioned regenerator can be completely compensated by the partial oxidation of partial stream $p$. If during a certain phase of the regeneration of the acceptor a maximum quantity of sulfur dioxide is produced, then a minimum quantity of oxygen or of oxygen-containing gas will be passed to the unit 14.

In FIG. 3, item 21 represents a flowmeter which measures the magnitude of the partial stream $q$. This meter is connected to controller 22 whose output is connected to a valve 23 in partial stream $q$. The set value for controller 22 is suplied by subtracting element 10. Valve 23 will be opened farther if the difference $F_2-F_1$ increases and vice versa. The ratio between partial stream $q$ and stream 16 to the oxidation unit 14 has to be maintained at a desired value in order to obtain the correct amount of sulfur dioxide in the reactor. This ratio can be adjusted with the aid of a ratio controller 24 and a valve 25 in line 16, which ratio controller receives signals from flowmeters 26 and 27, respectively, in partial stream $p$ and gas stream 16.

As mentioned hereinbefore, the stream of hydrogen sulfide-containing gas often remains constant for a long period. If this is not the case, then ratio control can be applied to good advantage to the stream of hydrogen sulfide or hydrogen sulfide-containing gas and the stream of oxygen or oxygen-containing gas to the partial oxidation reactor. In this case the aforementioned difference $F_2-F_1$ is used as the set value for the ratio control in such a way that the ratio between oxygen and hydrogen sulfide increases when that difference decreases, and decreases when that difference increases. In this way it is ensured that the gas mixture in the sulfur recovery reactor always has the desired composition, irrespective of the variations in the supply of hydrogen sulfide and/or in the supply of hydrogen sulfide-containing gas. This method is represented schematically in FIG. 4.

Figure 4:
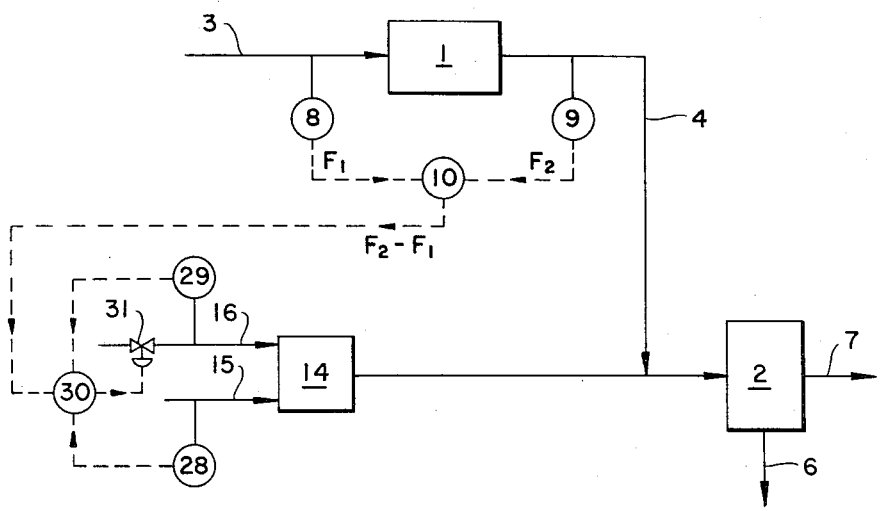

In FIG. 4, flowmeters 28 and 29 measure the magnitudes of gas streams 15 and 16, respectively. The signals from these meters pass to ratio controller 30 whose output signal adjusts valve 31 in oxygen-containing gas stream 16. The set value for controller 30 is supplied by the output signal of element 10. Some variations in this method of control are possible, but these are entirely within the purview of the invention.

The methods described hereinabove can be carried out fully automatically. The computing and control actions can be performed by analog instruments. It is also possible for these actions to be performed with the aid of a digital computer.

An apparatus suitable for carrying out the method according to the invention may comprise a regenerator for a loaded solid acceptor equipped with a supply line for a reducing gas and a discharge line for sulfur dioxide-containing gas, which discharge line is connected to a sulfur recovery reactor, equipped with a supply line for hydrogen sulfide or hydrogen sulfide-containing gas and with discharge lines for sulfur and gas, and incorporates a flowmeter connected to the supply line for the reducing gas, a flowmeter connected to the discharge line for the sulfur dioxide-containing gas, a subtracting element connected to the two aforementioned flowmeters, and a controller connected to the output of the subtracting element, of which controller the output is connected to a correcting unit in the supply line for hydrogen sulfide or hydrogen sulfide-containing gas.

Another embodiment concerns an apparatus comprising a regenerator for a loaded solid acceptor equipped with a supply line for a reducing gas and a discharge line for sulfur dioxide-containing gas, which discharge line is connected to a sulfur recovery reactor equipped with discharge lines for sulfur and for gas and with a supply line which is connected to the outlet of a partial oxidation unit. The partial oxidation unit is provided with supply lines for hydrogen sulfide or hydrogen sulfide-containing gas and for oxygen or oxygen-containing gas. Into this apparatus are incorporated a flowmeter connected to the supply line for the reducing gas, a flowmeter connected to the discharge line for the sulfur dioxide-containing gas, a subtracting element connected to the two aforementioned flowmeters, and a controller connected to the output of the subtracting element, of which controller the output is connected to a correcting unit in the supply line for oxygen or oxygen-containing gas or in a discharge line branching from that supply line.

We claim as our invention:

1. A method for controlling a process for the recovery of sulfur from a sulfur dioxide-containing gas by reaction of hydrogen sulfide with sulfur dioxide in a molar ratio maintained approximately equal to two, said sulfur dioxide-containing gas being at least partly derived from the regeneration with a reducing gas of a loaded solid acceptor that has been used for the removal of sulfur oxides from flue gases, which method comprises:

(a) measuring the magnitude of the reducing gas stream employed in regeneration thereby obtaining a signal $F_1$ corresponding to that magnitude,
    (b) measuring the magnitude of the sulfur dioxide-containing gas stream derived from regeneration thereby obtaining a signal $F_2$ corresponding to that magnitude,
    (c) determining the difference between $F_2$ and $F_1$ and using this difference to set the desired composition of the gas mixture to the sulfur recovery process.

2. The method of claim 1 wherein the difference determined in step (c) is used for adjusting the supply of hydrogen sulfide to the sulfur recovery process in such a manner that that supply is increased if that difference increases, and reduced if that difference decreases.

3. The method of claim 1 wherein the sulfur dioxide-containing gas derived from regeneration is combined with a sulfur dioxide-containing gas obtained by partial oxidation of hydrogen sulfide or a hydrogen sulfide-containing gas with oxygen or an oxygen-containing gas in a partial oxidation unit, and the difference obtained in step (c) is used to adjust the supply of oxygen or oxygen-containing gas in such a manner that the supply is decreased if that difference increases, and increased if that difference decreases.

4. The method according to claim 3 wherein the difference determined in step (c) is used to adjust the supply of oxygen or of oxygen-containing gas by adjusting the magnitude of a side stream taken from the stream of oxygen or oxygen-containing gas by increasing that side stream if that difference increases and reducing it if that difference decreases.

5. The method of claim 3 wherein the stream of hydrogen sulfide or hydrogen sulfide-containing gas is split into two partial streams, the first of which partial streams is passed directly to the sulfur recovery reactor and the second of which partial streams is passed to the partial oxidation unit, and the difference determined in step (c) is used to adjust the supply of oxygen or oxygen-containing gas to the partial oxidation unit in such a manner that that supply is decreased if that difference increases, and is increased if that difference decreases.

6. The process of claim 5 wherein the difference determined in step (c) is used to adjust the magnitude of the partial stream passed to the sulfur recovery reactor.

7. The method of claim 3 wherein the ratio of the stream of hydrogen sulfide or hydrogen sulfide-containing gas to the stream of oxygen or oxygen-containing gas to the partial oxidation unit is controlled using a ratio controller and the difference determined in step (c) is used as the set value in such a manner that the ratio between oxygen and hydrogen sulfide increases when that difference decreases and decreases when that difference increases.

References Cited
UNITED STATES PATENTS

| | | | |
|---|---|---|---|
| 1,435,846 | 11/1922 | Hogg | 23—256 |
| 3,424,560 | 1/1969 | Carmassi et al. | 23—224 X |
| 3,501,897 | 3/1970 | Van Helden et al. | 23—25 X |

FOREIGN PATENTS

| | | | |
|---|---|---|---|
| 722,038 | 1/1955 | Great Britain | 23—225 P |

OSCAR R. VERTIZ, Primary Examiner

G. O. PETERS, Assistant Examiner

U.S. Cl. X.R.

23—256; 55—21; 137—7, 100; 423—574